(12) United States Patent
Leimann (10) Patent No.: US 7,721,419 B2
(45) Date of Patent: May 25, 2010

(54) TOOL FOR ASSEMBLING A TAPER ROLLER

(75) Inventor: Dirk-Olaf Leimann, Edegem (BE)

(73) Assignee: Hansen Transmissions International, N.V., Edegem, Antwerp (BE)

(*) Notice: Subject to any disclaimer, the term of this patent is extended or adjusted under 35 U.S.C. 154(b) by 9 days.

(21) Appl. No.: 12/135,912

(22) Filed: Jun. 9, 2008

(65) Prior Publication Data

US 2008/0304782 A1   Dec. 11, 2008

Related U.S. Application Data (62) Division of application No. 10/471,237, filed on Mar. 5, 2004, now Pat. No. 7,210,852.

(51) Int. Cl.
| | |
|---|---|
| *B21D 39/03* | (2006.01) |
| *B21D 53/10* | (2006.01) |
| *B21K 1/10* | (2006.01) |
| *B21K 1/76* | (2006.01) |
| *B23P 11/00* | (2006.01) |
| *B25B 1/20* | (2006.01) |
| *F16C 33/58* | (2006.01) |
| *F16C 43/04* | (2006.01) |

(52) U.S. Cl. ............... 29/724; 29/428; 29/434; 29/898.041; 29/898.061; 29/898.062; 29/898.07; 29/898.09; 269/37; 384/571; 384/584

(58) Field of Classification Search ............ 29/724, 29/898.07–898.09, 898.052, 898.045, 725, 29/428, 434, 445, 450, 898.042, 898.061–65; 384/450, 571, 584, 582, 600, 215, 537, 539, 384/585; 269/9, 37, 294; 81/26, 492, 487, 81/484

See application file for complete search history.

(56) References Cited

U.S. PATENT DOCUMENTS

| 606,635 A | 6/1898 | Timken |
| 1,545,841 A | 7/1925 | Miller |
| 1,599,332 A * | 9/1926 | Kerr .............................. 29/263 |
| 1,784,914 A | 12/1930 | Strickland et al. |
| 2,474,016 A | 6/1949 | Sydney |
| 3,830,633 A * | 8/1974 | Harbottle .................. 29/898.09 |
| 4,504,166 A * | 3/1985 | Morin ......................... 403/147 |
| 4,694,569 A * | 9/1987 | Colvell et al. .................. 29/724 |
| 5,442,854 A * | 8/1995 | Koltookian et al. ...... 29/898.07 |
| 5,711,738 A * | 1/1998 | Abe et al. .................... 475/246 |
| 6,363,596 B1 * | 4/2002 | Reiter et al. ................... 29/278 |

FOREIGN PATENT DOCUMENTS

| FR | 750 195 | 8/1933 |
| GB | 304 992 | 1/1929 |

* cited by examiner

*Primary Examiner*—David P Bryant
*Assistant Examiner*—Alexander P Taousakis
(74) *Attorney, Agent, or Firm*—Young & Thompson (57) ABSTRACT

A full complement taper roller bearing consists of an inner ring or cone having an inner track on its radially outer conical surface, and an outer ring or cup having an outer track on its radially inward conical surface and one or more rows of taper rollers having a contact angle of less than 30 degrees freely disposed between the inner and outer rings and guided between said tracks. Each row of rollers is axially located within a recess on the inner track defined by a shoulder abutment disposed at least at the edge of the inner track having the greatest diameter and each of the rollers is in contact with the inner track over the entire length of the taper roller in the axial direction of the bearing. A method of assembly is also enclosed.

10 Claims, 10 Drawing Sheets

TOOL FOR ASSEMBLING A TAPER ROLLER

This application is a division of application Ser. No. 10/471,237, filed on Mar. 5, 2004, now U.S. Pat. No. 7,210,852 the entire contents of which are hereby incorporated by reference.

BACKGROUND OF THE INVENTION

This invention relates to a complete or full complement taper roller bearing by which is meant a taper roller bearing without a bearing cage and having a full complement of rollers. The invention also discloses a method of assembling such a full complement bearing.

Figure 5:
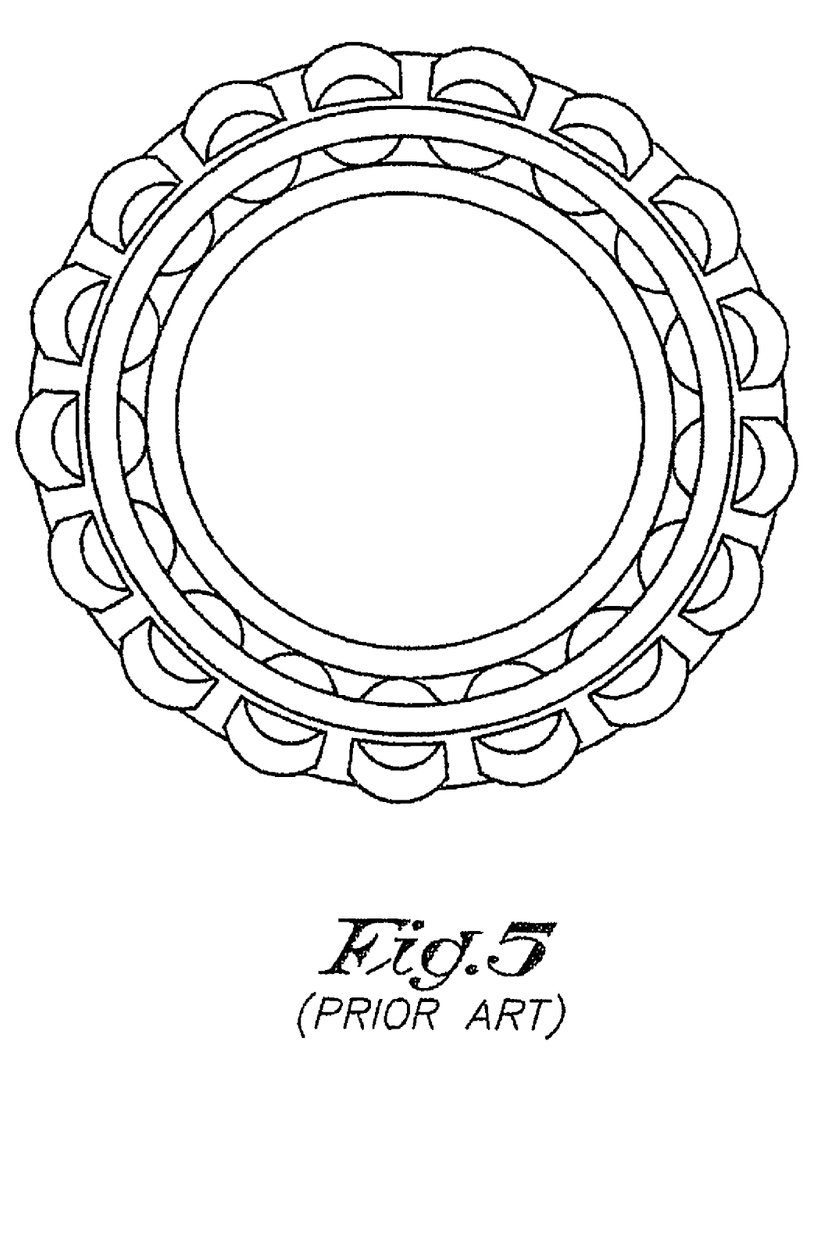
FIG. 5 shows a view of an assembly of an inner ring rollers and cage of a conventional taper roller bearing.

Taper roller bearings are well known as a roller bearing element. The normal design shown in FIGS. 1, 2 and 5 consists of an inner ring or cone, an outer ring or cup, rollers and a cage. The purpose of the cage is to guide the rollers and retain them in place in the absence of the cup, for example during assembly of the bearing. In an assembled arrangement the inner ring or cone, rollers and the cage form one unit whilst the other component by which the bearing can be mounted to shafts or into housings.

In the common design of taper roller bearings the axial guidance of the rollers is achieved by means of a recess on the inner ring or cone which in combination with the cage keeps the rollers in position and guides them to the center of the cone.

Figures 2, 2A, 2B, 2C:
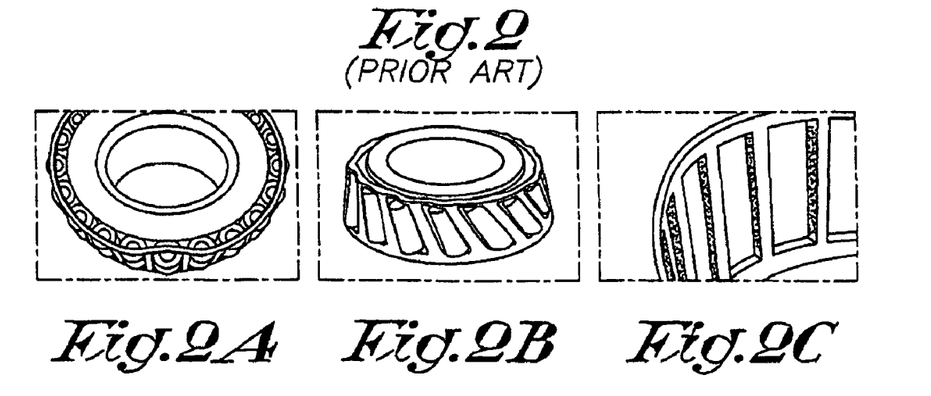
FIGS. 2a to 2c show various aspects of damage to the bearing cage due to problems in service.

However this common design of taper roller bearing is prone to failure due to deformation of the cage, cage ring compression or cage pocket wear, examples of which are illustrated in FIGS. 2a, 2b and 2c respectively.

A full complement taper roller bearing in a well known O arrangement for shafts is known from U.S. Pat. No. 606,635. However, in this known configuration axial location and guidance of the rollers is by means of two axially spaced apart recesses provided on each of the taper roller bearing surfaces which engage with complimentary spaced apart ribs which project radially outwardly of the bearing surface or track of the radially inner ring or cone. The configuration of ribs and recesses on the bearing surfaces disclosed in U.S. Pat. No. 606,635 both reduces the load carrying capacity of the bearing by reducing the available roller surface and increases the risk of premature failure by wear and breakage of the ribs.

Accordingly it is an object of the present invention to provide a full complement taper roller bearing which overcomes or at least mitigates the above mentioned problems.

SUMMARY OF THE INVENTION

According to a first aspect the present invention provides a taper roller bearing of the full complement type consisting of an inner ring or cone having an inner track, on its radially outer conical surface, and an outer ring or cup having an outer track on its radially inward conical surface and one or more rows of taper rollers having a contact angle of less than 30 degrees freely disposed between the inner and outer rings and guided between the said tracks, wherein each row of rollers is axially located within a recess on the inner track defined by a shoulder abutment disposed at the edge of the inner track having the greatest diameter and wherein each of the rollers is in contact with the inner track over the entire length of the taper roller in the axial direction of the bearing.

According to a second aspect the invention provides a method of assembly of a full complement taper roller bearing comprising forming a first assembly of the rollers about the inner track of the cone, applying retaining means to retain the rollers on the inner track and subsequently forming the final assembly by inserting the first assembly into an outer ring.

According to a third aspect the invention provides a method of assembling a full complement taper roller bearing comprising inserting an assembly tool concentrically into the center of the outer ring, the assembly tool having a radially outer surface of substantially the same conicity as the inner track, then assembling the full complement of rollers between the assembly tool and the outer ring, withdrawing the assembly tool from inside of the outer ring and replacing it with an inner ring.

By contact angle is meant the angle between a straight line normal to the outer track and a straight line parallel to the plane of rotation of the bearing and as defined in ISO standard 281:1990.

Preferably the contact angle is in the range of 5 to 30 degrees, more preferably it is between 10 and 20 degrees inclusively.

BRIEF DESCRIPTION OF THE DRAWINGS

Further aspects on the present invention will become apparent from the description of following embodiments of the invention and in conjunction with the following drawings in which.

DESCRIPTION OF THE PREFERRED EMBODIMENTS

Figures 1, 1A:
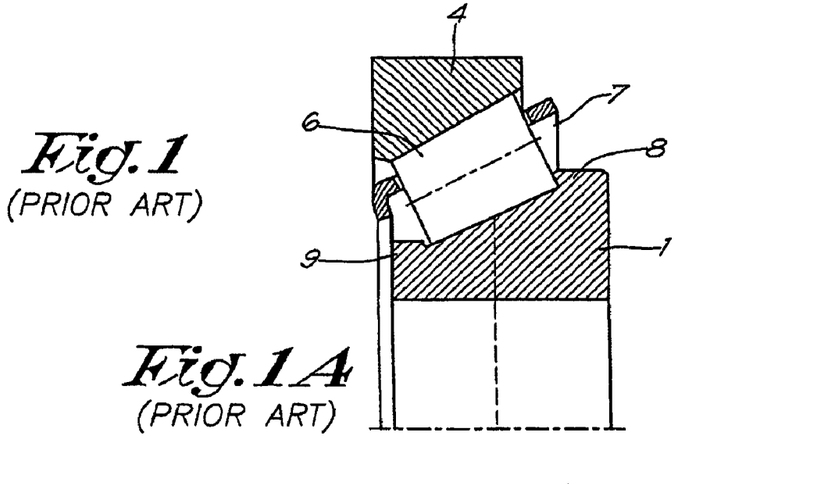
FIGS. 1a and 1b shows schematic cross sectional diagrams of a conventional, bearing comprising taper rollers confined in cage.
Figure 1B:
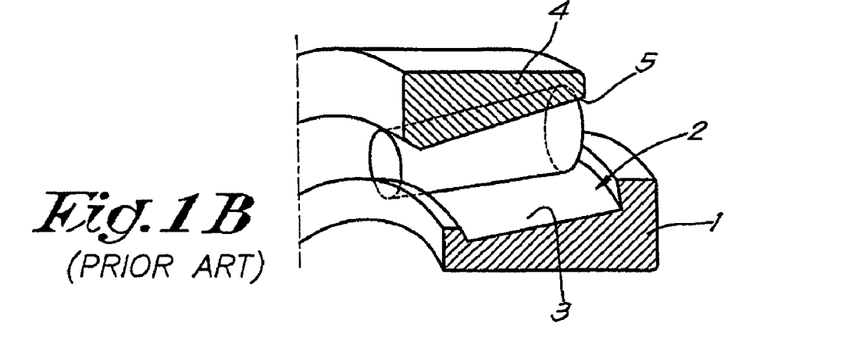

Shown in FIGS. 1a and 1b is the assembly of a conventional caged type taper roller bearing, comprising the elements of an inner ring or cone 1, an outer ring or cup 4 and freely disposed between the cone and cup a plurality of rollers 6 contained within a circumferentially extending cage 7.

The radially outer conical surface 3 of the inner ring or cone is provided with inner track 2 and similarly the radially inwardly facing conical surface 5 of the outer ring or cup 4 provides an outer track.

The taper rollers are located and guided in the inner track 2 by virtue of shoulder abutments 8, 9 provided at the axial edges of the inner ring, which shoulder abutment 8 acts on the plane end of the taper rollers when the bearing is loaded. The axial edge of the inner track having the greater diameter is commonly referred to as the heel whilst the edge having the lesser diameter is commonly referred to as the toe. Accordingly the shoulder abutments 8, 9 will be referred to respectively as the heel shoulder abutment and the toe shoulder abutment.

Figure 3:
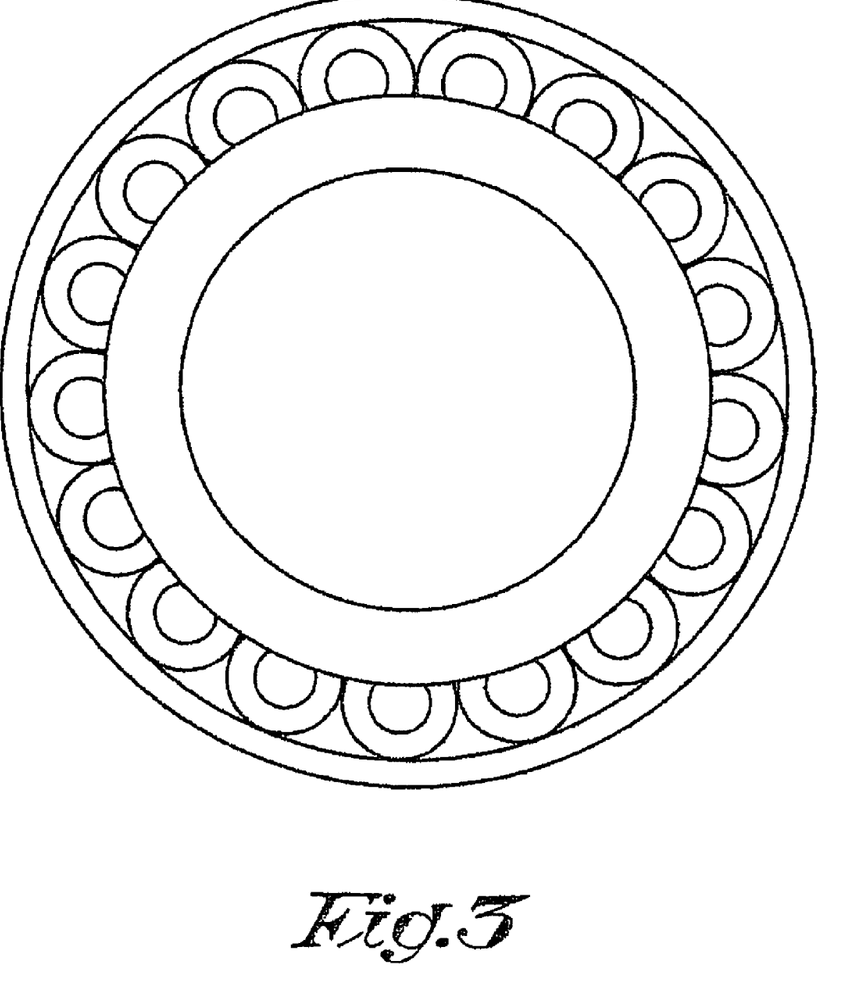
FIG. 3 shows a view taken from the heel side of the inner ring or cone of a full complement taper roller bearing according to the present invention.
Figure 4:
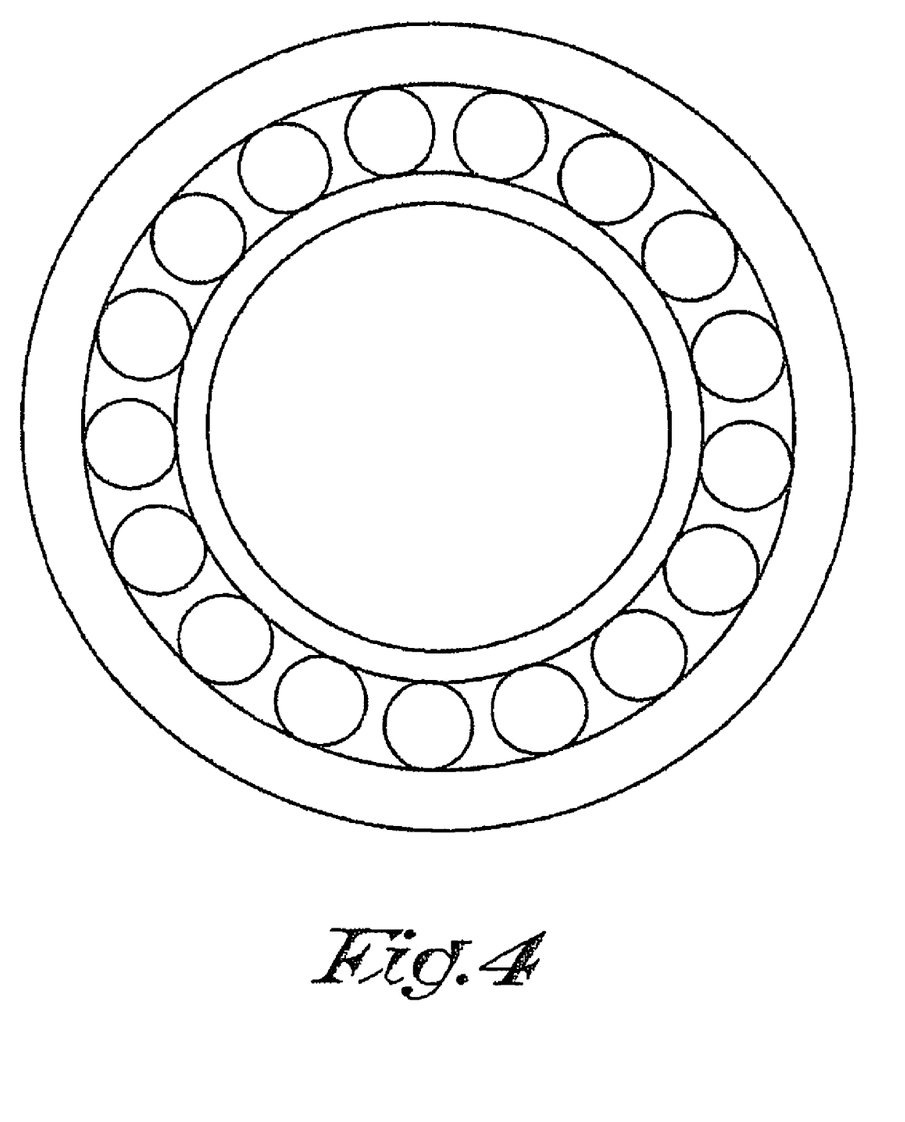
FIG. 4 shows a view of the full complement bearing of FIG. 3 taken from the toe side of the inner ring.

Shown in FIGS. 3 and 4 is a full complement taper roller bearing according to the present invention.

FIG. 3 shows a view of the bearing from the heel side of the inner ring or cone and clearly shows a full complement of rollers without a roller cage. FIG. 3 also shows that the bearing is provided with a heel shoulder abutment on the inner ring whereas on the toe side of the inner ring no such shoulder abutment is provided as is evident from FIG. 4.

Whilst the bearing of the present invention shown in FIGS. 3 and 4 has by necessity a roller locating and guiding heel shoulder abutment it may also have a toe shoulder abutment on the inner ring.

Figure 6:
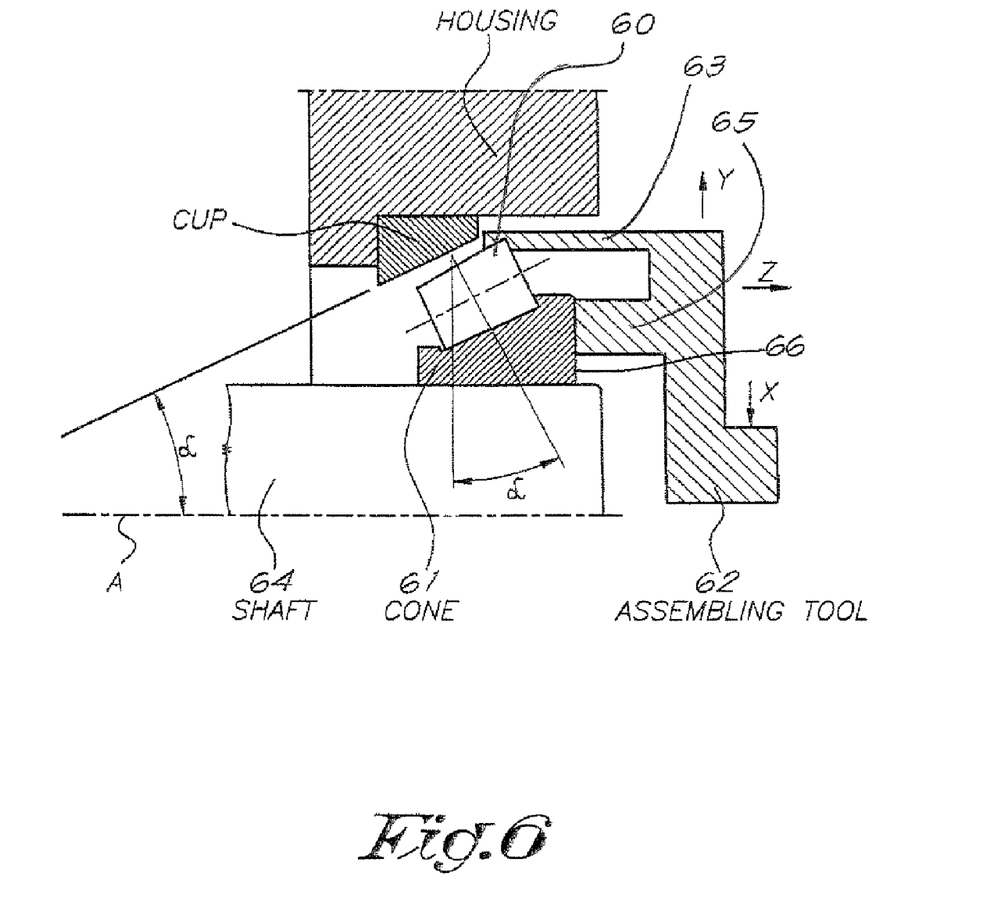
FIG. 6 shows a schematic scrap sectional view of one method of assembling the full complement bearing of the present invention using an assembly tool.

The contact angle $\alpha$, being the angle between a straight line extending perpendicularly from the outer track and a line parallel to the plane of rotation or bearing as shown in FIG. 6, is in accordance with the present invention not less than 5 degrees and not greater than 30 degrees. Contact angle $\alpha$ thus corresponds with the inclination of the outer track to longitudinal axis A of the shaft to which the inner ring or cone is fitted. Preferably the contact angle of the bearing is in the range of 10 to 20 degrees such that the bearing is particularly suitable for use in radially directed high load conditions.

The present invention is particularly directed to bearings of a heavy duty type for use with shafts in the range of 25 mm to 150 mm in diameter (e.g., shaft 64 in FIG. 6). Typically the maximum speed conditions encountered in such uses would be approximately 5,500 rpm for a 25 mm diameter shaft and 1,500 rpm for 150 mm diameter shaft.

Whilst the above described full complement taper roller bearing has only one shoulder abutment on the heel side of inner ring or cone it may in addition have a shoulder abutment on the toe side.

In addition to providing a full complement taper roller bearing the invention also provides various methods of assembling the components of the bearing.

A first method of assembly of the bearing is shown in FIG. 6 which shows a half sectional view of the components of a bearing together with an assembly tool 62. It is to be understood that FIG. 6 only shows one half of the arrangement and the other half is disposed symmetrically below the axis A of the shaft. Accordingly the assembly tool 62 is substantially cylindrical in shape and is diametrically split into top and bottom halves, the top half being shown in FIG. 6. The radially outer cylindrical surface of the assembly tool 62 is provided with an axially extending projection or projections 63 which by movement apart of the two halves of the assembly tool 62 in the direction indicated by arrow Y can be positioned axially inward of the axial and radial outer edge of the rollers.

Thereafter by movement of the two halves of the assembly tool 62 back towards each other in the direction indicated by arrow X the projection 63 can engage the axial and radial outer edge of the rollers. The axial end of the projection 63 may be shaped on its radially inward side to conform to the axially and radially outward portion of the roller as shown to facilitate engagement with the roller.

According to the first method of assembly illustrated in FIG. 6 the taper rollers 60 are assembled into their final position of the inner track of the cone 61 and held there by means of the assembly tool 62 having an axially extending projection or projections 63 which contact and hold the axially and radially outer portion of each roller to clamp the roller in the track as shown. The assembly tool 62 is generally of cylindrical shape having a diameter across the axial projection or projections 63 which is less than the outer diameter of the outer ring or cup such that the cup may be assembled into its final housing whilst still enabling the assembly of the taper rollers with the inner cone and the cup to be moved towards each other into the position of close proximity shown in FIG. 6. The assembly tool 62 has another axial extending projection 65 radially inward of the projection 63 which abuts as shown the heel side 66 of the inner ring 61 to facilitate movement of the assembly. Further the thickness dimension of the projection 63 in the radial direction and the outer diameter of the cup are such as to permit sufficient movement apart of the halves of the assembly tool 62 to enable withdrawal of the tool.

Once the assembly is in the position shown in FIG. 6 the two halves of the assembly tool 62 are moved radially apart in the direction indicated by arrow Y until the projection or projections 63 are clear of the rollers at which point the parts of the assembly tool are withdrawn in the direction Z. The close proximity of the assembly of the rollers and the cone to the cup ensures that the rollers can not be dislodged and in the final operation the cup and roller cone assembly are again moved towards each other to reach their final position and complete the assembly.

Whilst the above described method is designed as an assembly tool in the form of two half cylinders the assembly tool may of course be divided into three or more parts such as for example four quadrants which will be radially expandable by moving in four directions, the direction of movement of each quadrant being at right angles to the direction of movement of an adjacent quadrant.

Such an assembly tool may also comprise any suitable elastically deformable clamping members which can be operatively switched between a radially contracted state and a radially expanded state and vice-versa.

Figure 7A:
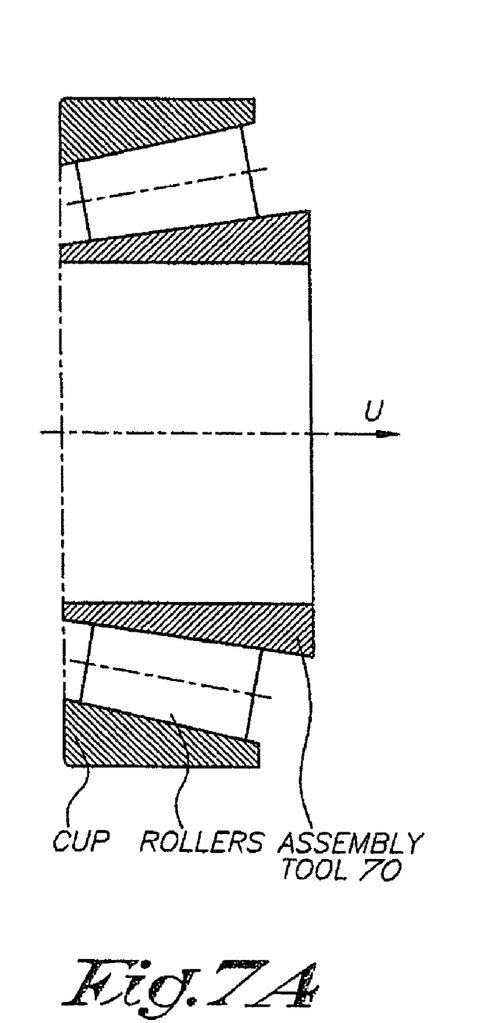
FIGS. 7a to 7d show another method of assembling the full complement roller bearing of the present invention using another assembly tool.
Figure 7B:
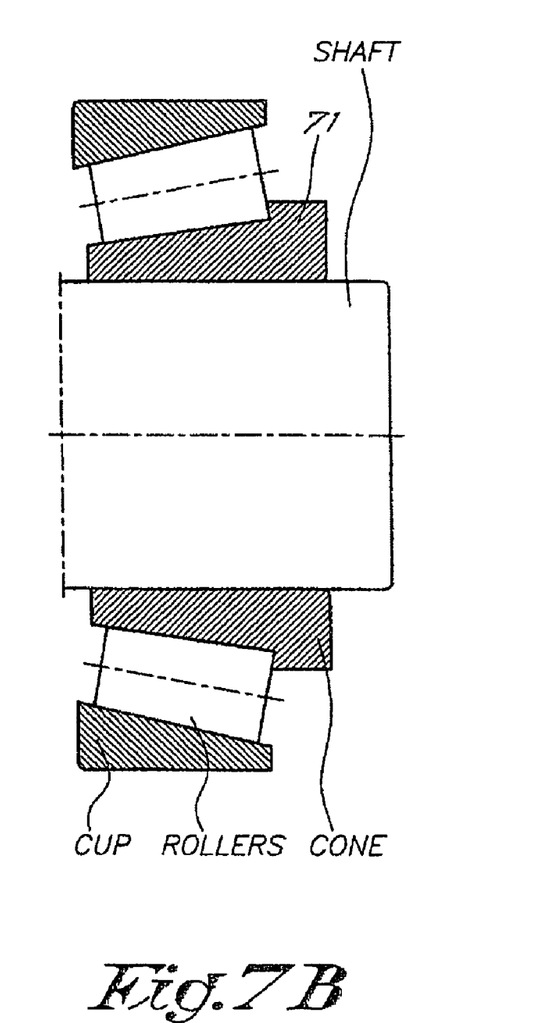

This first method of assembling a full complement taper roller bearing is particularly applicable to a bearing having roller abutment shoulders on both the heel and toe sides of the inner track or to situations where the bearing must be assembled with the row of rollers orientated vertically.

Where a shoulder abutment is not employed on the toe end of the inner track and where the bearing can be assembled with the row of rollers orientated horizontally then a method illustrated in FIGS. 7a and 7b may be employed.

In the first part of the method shown in Figure A the outer ring or cup is placed in a horizontal orientation with the outer track edge having the greater diameter uppermost. An assembly tool 70 having a radially outer surface of similar conicity to the eventual inner track is placed concentrically inside the outer ring or cup. The absence of a shoulder abutment on the assembly tool facilitates assembly of the full complement of taper rollers between the assembly tool 70 and the outer ring.

Figure 8:
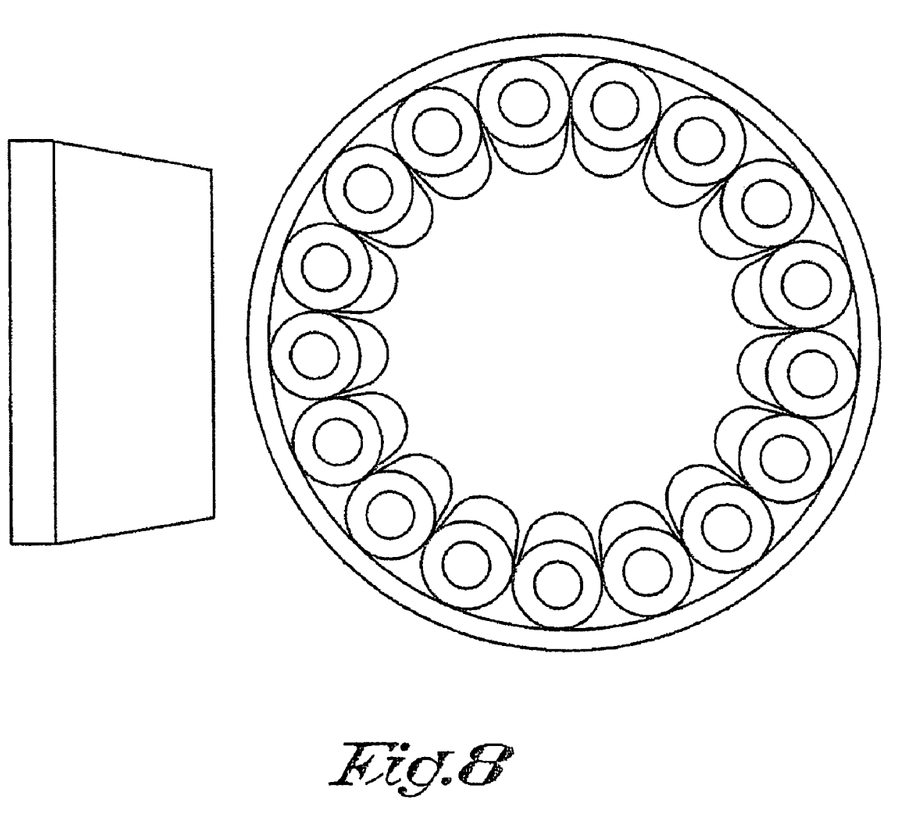
FIG. 8 shows a view of the taper rollers assembled into the outer ring or cup prior to the insertion of the inner ring or cone according to the method depicted in FIGS. 7a to 7d.

Subsequently the assembly tool 70 is withdrawn from the assembly of the outer ring of rollers by moving it in an upwards direction indicated by the arrow U in FIG. 7a. This partial assembly of the rollers within the outer ring or cup is shown in FIG. 8.

Figure 7C:
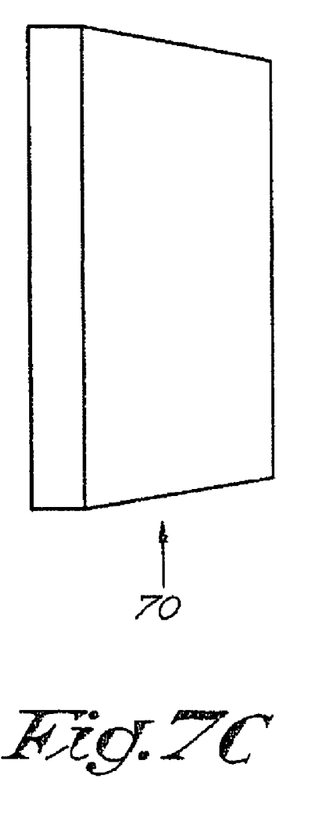
Figure 7D:
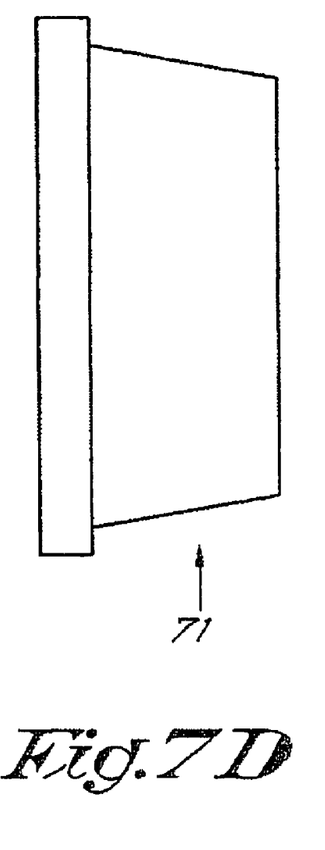

In the final stage of the assembly the inner ring or cone 71 is introduced into the center of the assembly from above i.e. by moving it in the opposite direction to arrow U. FIGS. 7c and 7d show respectively the assembly tool 70 and cone 71.

In addition to the above described method of assembly other methods of assembling a full complement taper roller bearing other methods may be employed.

Figure 9A:
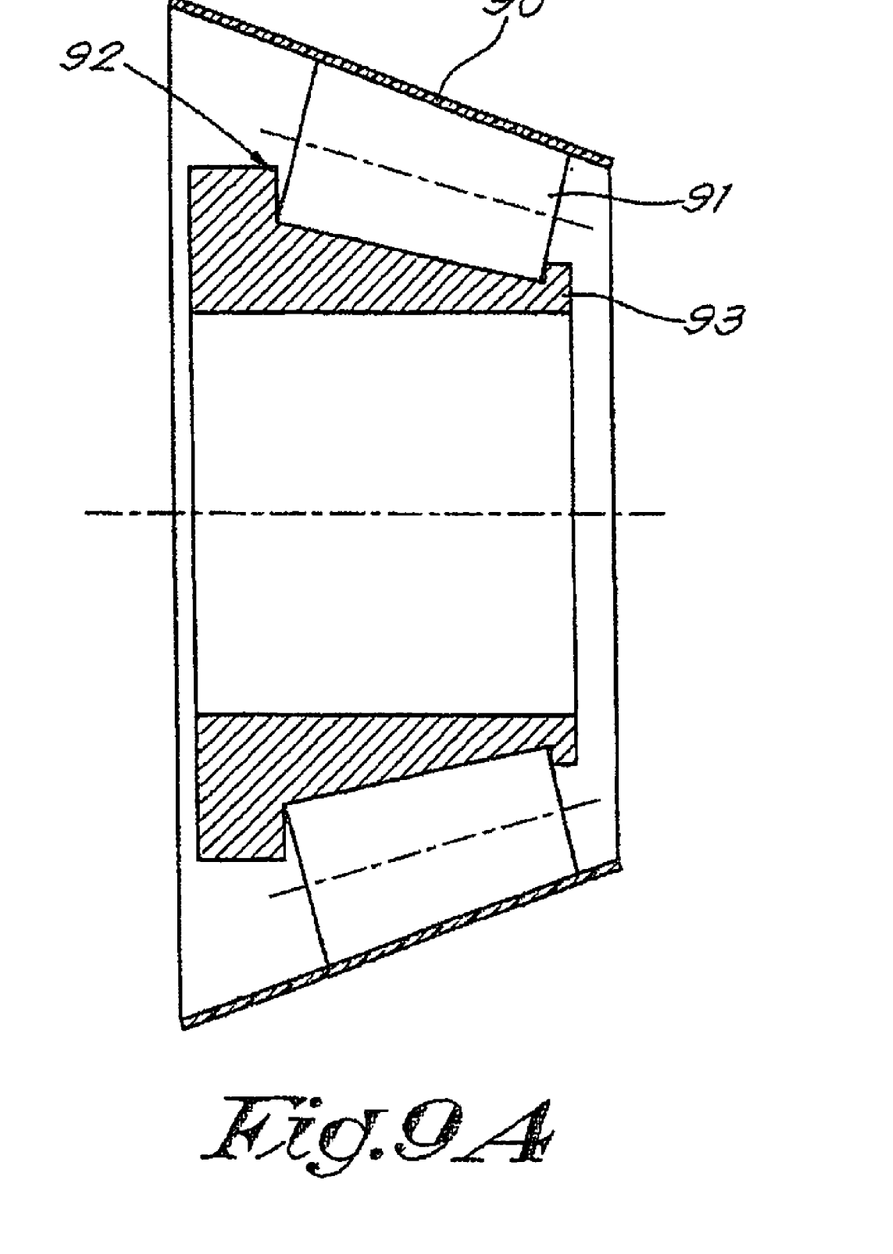
FIGS. 9a and 9b show another method of retaining the rollers positioned on the inner ring or cone prior to assembly with the outer ring or cup.
Figure 9B:
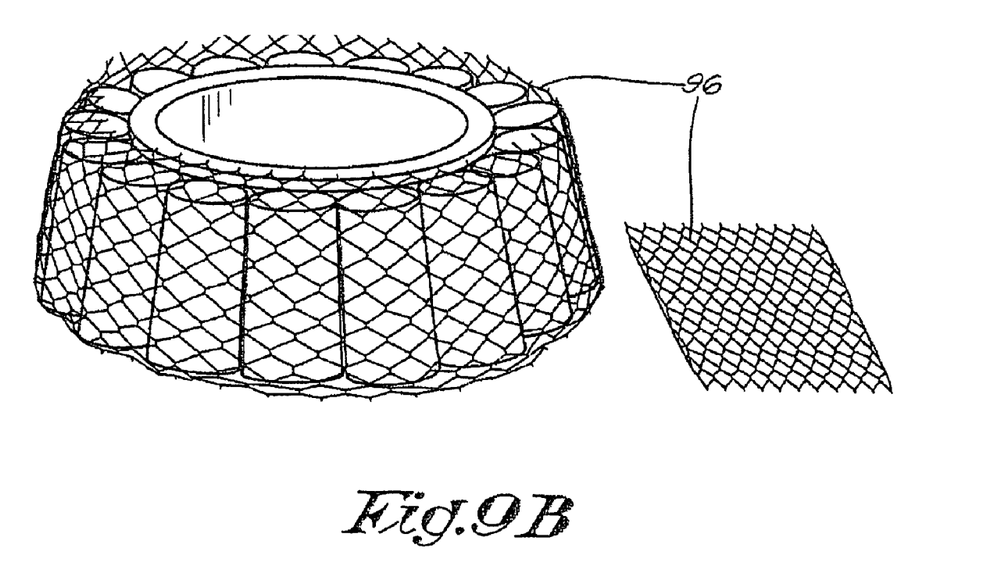

One such method illustrated in FIGS. 9a and 9b is to use an elasticated member 90 to hold the taper rollers 91 in the inner track 92 of the cone 93 prior to assembly into the cup. The elastic member may be a band of elastomeric material such as rubber or an expandable plastic mesh 96 as shown in FIG. 9b. The elastic member may be removed after assembly into the cup or where suitable may be left in position to be ruptured or disintegrated and expelled on first use of the bearing.

Other methods of assembling the taper roller bearing of the invention may include the use of temporary adhesives such as viscous lubricants such as greases to hold the rollers in either the cup or the cone or where the materials of the bearing permit the use of temporary magnetization provided for example by the use of an electromagnet.

Full complement taper roller bearings according to the invention provide high load carrying capabilities by virtue of a greater number of rollers and utilization of the entire width of the roller surface with reduced risk of premature failure by elimination of a roll cage.

According to another aspect the present invention provides a method of assembling a full complement taper roller bearing in industrial gear units having monolithic housings or bearing uptakes, i.e. housings or bearing uptakes without a split plane.

The invention claimed is:

1. An assembly tool for use in assembling a taper roller bearing having a plurality of taper rollers, comprising:
axially first extending each projections configured to contact and hold an axially and radially outer portion of the taper rollers of the roller bearing so to clamp the rollers in a track of the roller bearing and axially extending second projections, radially inward of the first projections, which abut a heel side of an inner ring of the roller bearing.

2. The assembly tool according to claim 1, wherein the tool is generally of cylindrical shape having a diameter across the first axial projections which is less than an outer diameter of an outer ring or cup of the roller bearing.

3. The assembly tool according to claim 2, wherein the tool is divided into two half cylinders or into multiple parts of equal shape.

4. The assembly tool according to claim 3, wherein a thickness dimension of the first projections in a radial direction and the outer diameter of a cup of the roller bearing are such as to permit sufficient movement apart of the extending projections of the assembly tool.

5. The assembly tool according to claim 1, wherein the first projections comprise elastically deformable clamping members operatively switchable between a radially contracted state and a radially expanded state.

6. An assembly tool for use in assembling a taper roller bearing having a plurality of taper rollers, comprising:
a radial first portion; and
a radial second portion,
the first portion being symmetric with the second portion, and the first portion and the second portion configured to be moved toward or apart from each other,
the first portion and the second portion each comprising an axially extending projection configured to contact and hold an axially and radially outer portion of a roller of the roller bearing,
wherein the first and second portions, in a first mode, are positioned apart from each other sufficient for the extending projections to be positioned axially inward of an axial and radial outer edge of the rollers of the roller bearing,
wherein the first and second portions, in a second mode, are positioned toward each other sufficient for the extending projections to engage the axial and radial outer edge of the rollers so to clamp the rollers in a track of the roller bearing,
wherein the first and second portions, in a third mode, are positioned apart from each other such that the extending projections are clear of the rollers to be withdrawn from the roller bearing and wherein the first and second portions each further comprise an axial extending inner projection provided radially inward of the extending projection and extending in a same direction as the extending projection, each inner projection configured to abut a heel side of an inner ring of the roller bearing.

7. The assembly tool according to claim 6, wherein the radial first portion forms a first half of a cylindrical body, and the radial second portion forms a second half of the cylindrical body.

8. An assembly tool for use in assembling a taper roller bearing having a plurality of taper rollers, comprising:
a plurality of clamping members comprised of axially extending first projections and axially extending second projections, the second projections being radially inward of the first projections,
wherein each of the clamping members, in a first mode, are positioned apart from each other sufficient to be positioned axially inward of an axial and radial outer edge of the rollers of the roller bearing,
wherein each of the clamping members, in a second mode, are positioned toward each other sufficient to engage the axial and radial outer edges of the rollers so to clamp the rollers in a track of the roller bearing, and
wherein each of the clamping members, in a third mode, are positioned apart from each other such to be withdrawn from the roller bearing.

9. The assembly tool according to claim 8, further comprising:
a cylindrical body with an outer cylindrical surface, the cylindrical body constituted at least of a first portion and a second portion,
wherein the plurality of clamping members project axially from the outer cylindrical surface of said first portion and said second portion, and
wherein the first portion and the second portion are configured for movement such to move the projections radially away with a first movement and radially toward each other with a second movement to position the clamping members into the first mode, the second mode, and the third mode.

10. The assembly tool according to claim 8, wherein the clamping members comprise elastically deformable members configured to radially expand and contract to position the clamping members in any of the first, second, or third modes.

* * * * *